United States Patent [19]

Hanssen et al.

[11] Patent Number: 4,624,537
[45] Date of Patent: Nov. 25, 1986

[54] ARRANGEMENT FOR MULTIPLYING THE OUTPUT OF AN ACTUATING MANIPULATOR BY A FACTOR DEPENDENT UPON THE SPEED OF THE ACTUATING MOVEMENT THEREOF TO CONTROL THE MOVEMENT OF A DISPLACEABLE MEMBER OF AN APPARATUS

[75] Inventors: Adalbert Hanssen, Aalen-Unterkochen; Jürgen Schwarz, Oberkochen, both of Fed. Rep. of Germany

[73] Assignee: Carl-Zeiss-Stiftung, Heidenheim, Fed. Rep. of Germany

[21] Appl. No.: 642,758

[22] Filed: Aug. 21, 1984

[30] Foreign Application Priority Data

Aug. 24, 1983 [DE] Fed. Rep. of Germany ....... 3330476

[51] Int. Cl.$^4$ ........................ G02B 21/26; G09G 3/02
[52] U.S. Cl. ..................................... 350/531; 340/709
[58] Field of Search ...... 350/531; 74/471 R, 471 XY; 318/386, 571; 340/709-710, 749; 250/221; 364/166, 170-171, 190, 755, 762

[56] References Cited

U.S. PATENT DOCUMENTS

| | | | |
|---|---|---|---|
| 2,585,120 | 2/1952 | Harrington, Jr. | 74/471 |
| 3,051,026 | 8/1962 | Costa | 74/471 |
| 3,110,865 | 11/1963 | Scuitto | 318/571 |
| 3,541,521 | 11/1970 | Koster | 364/521 |
| 4,493,992 | 1/1985 | Geller | 340/709 |

FOREIGN PATENT DOCUMENTS 69415  4/1982  Japan .................................. 318/571

OTHER PUBLICATIONS

Kraft, W., "The New Accommodation Focusing Control in the Leitz HM-LUX3", Leitz Sci. & Tech. Inf. (Germany), vol. 7, #6, 6-1979, pp. 182-183.

*Primary Examiner*—William H. Punter
*Attorney, Agent, or Firm*—Walter Ottesen

[57] ABSTRACT

The invention is directed to an arrangement for controlling a movement and includes an arrangement wherein the an actuating manipulator provides an output signal proportional to displacement. The arrangement includes a circuit which multiplies the output signal by a factor F which is dependent upon the speed of the actuation. In this way, the manipulator is suitable not only for controlling very fine sensitive positioning; but it also allows a fast displacement of the driven part over large distances. With manipulators for controlling movements in more than one dimension, output signals are multiplied by the same factor for all coordinates in order that directional accuracy of the movement is guaranteed at all speeds. A track ball can be utilized as a manipulator, for example. The arrangement of the invention is applicable for manually positioning microscope tables, coordinate measuring machines and ophthalmic apparatus.

16 Claims, 3 Drawing Figures

4,624,537

ARRANGEMENT FOR MULTIPLYING THE OUTPUT OF AN ACTUATING MANIPULATOR BY A FACTOR DEPENDENT UPON THE SPEED OF THE ACTUATING MOVEMENT THEREOF TO CONTROL THE MOVEMENT OF A DISPLACEABLE MEMBER OF AN APPARATUS

BACKGROUND OF THE INVENTION

A control stick is often used for manually controlling the movement of motor-driven machines or instrument parts whereby the deflection of the control stick determines the speed of the part to be moved. Such control sticks usually include a transmitter with a progressive characteristic which provides that an over-proportional driving action is obtained with full deflection.

Control sticks with speed control are, however, badly suited for fine positioning tasks for reasons among which is the dead point at the center position. For example, the movement along a predetermined path is not easily possible or requires very well trained operating personnel.

Control elements proportional to travel are needed for fine positioning tasks, that is, actuating manipulators having a transmitter which delivers a signal proportional to the actuating displacement. Such a manipulator is known, for example, under the name "track ball" which is primarily an input device for computer equipment such as for controlling marks on display screens.

The last-mentioned displacement-proportional manipulators do permit precise positioning. However, when working with such devices, the condition is disturbing that one must roll the ball a substantial length of time to locate positions which are far apart from each other and the time needed for such rolling action is longer in proportion to the sensitivity at which the step-down of the actuating manipulator is set.

This situation can be alleviated in a manner analogous, for example, to the focusing movement of a microscope by providing the known mechanical combination of a coarse-fine drive with a second manipulator having a lower reduction or a switch to switch the reduction ratio. However, this would require an additional control element and would require an additional manual movement by the operator.

SUMMARY OF THE INVENTION

It is an object of the invention to provide an arrangement which permits the same manipulating component having a proportional characteristic to be used without additional manual movement and which permits a sensitive positioning as well as rapidly passing over a larger displacement path.

Thus, the arrangement according to the invention includes a circuit within which the signals delivered by the actuating manipulator are multiplied by a factor dependent upon the speed of the actuating movement.

The arrangement can be connected between the actuating manipulator and the instrument to be controlled and simplifies the control of the instrument in the manner described. The arrangement according to the invention now also permits such instrument movements to be controlled by electrical means with the aid of a single actuating manipulator which up to now have been conducted with a mechanical coarse-fine drive.

The arrangement of the invention advantageously permits the mechanical stage of a microscope to be moved in elevation for focusing or in the plane of the object for scanning the specimen, as well as to control the movable axes of a multi-coordinate measuring machine or to position an ophthalmic instrument or an operation microscope.

Conventionally available rotational transmitters can be used as manipulators for a one dimensional movement. For controlling multi-dimensional movements, a so-called track ball which is commercially available can be utilized.

The velocity factor increases with the speed of actuation and can be, for example, proportional to the actuating speed. However, it is especially advantageous if this factor is formed from a value according to a predetermined function, the value depending on the actuating speed. This can be realized by utilizing an amplifier with a nonlinear characteristic or a microprocessor which selects the factor from a predetermined freely programmed data table according to the actuating speed. In this way, the highest flexibility is ensured when adapting the motoric of the operating person to the positioning task at hand.

It is necessary that the signals assigned to the individual coordinates and delivered by the manipulator be multiplied by the same factor in order to ensure the accuracy of direction of the displacement movement with multi-dimensional manipulators such as a track ball. This factor can be determined by the mean or the maximum of the quantities of the speed of the actuating movements in the individual coordinates and can be, for example, proportional to these quantities.

DESCRIPTION OF THE PREFERRED EMBODIMENTS OF THE INVENTION

Figure 1:
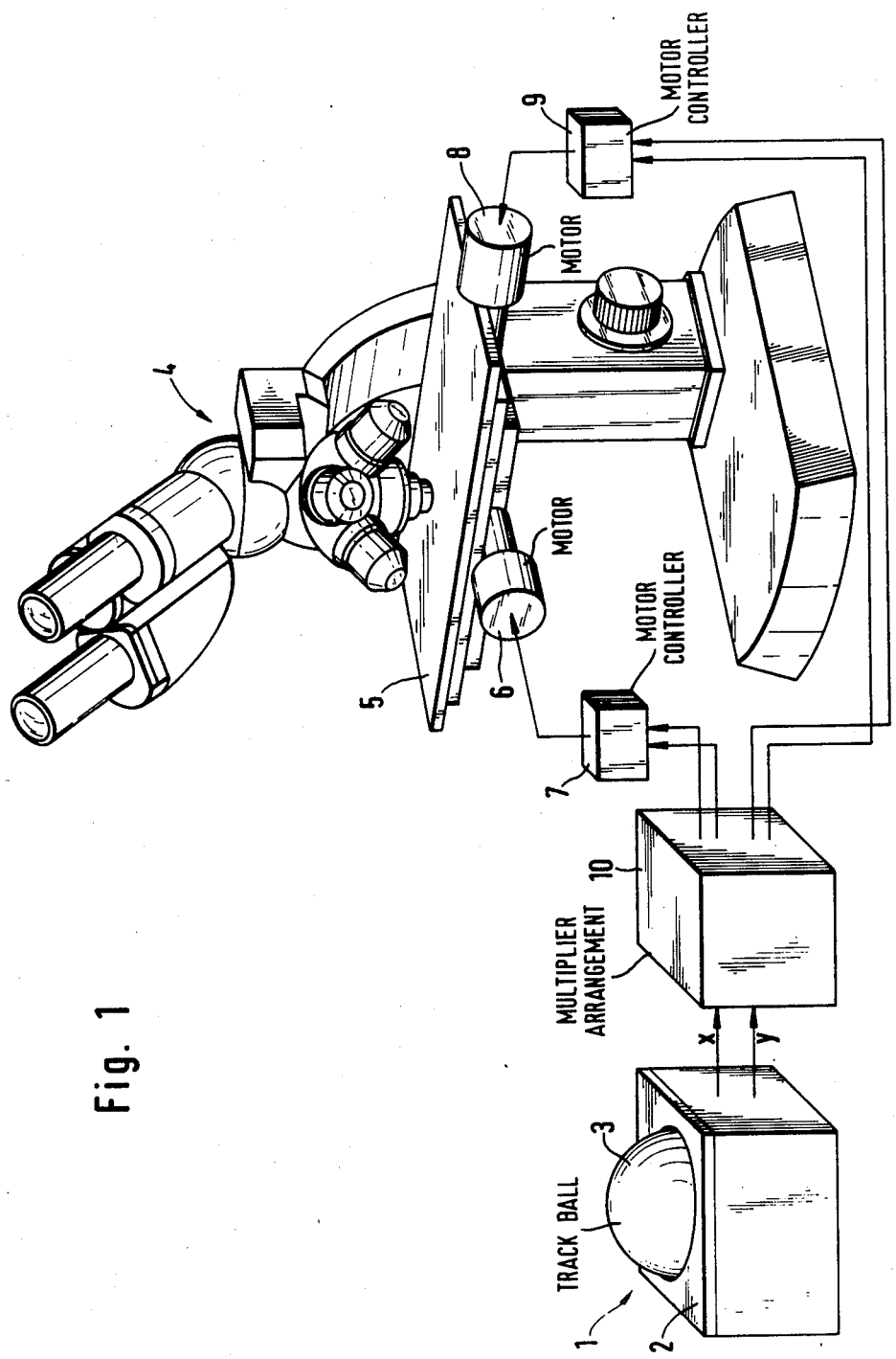
FIG. 1 is a perspective diagram showing how the arrangement according to the invention is applied to the movement of the mechanical stage of a microscope.

Referring to FIG. 1, a microscope 4 is equipped with a motor-displaceable mechanical stage 5. The displacement drives 6 and 8 for the coordinates X and Y are step motors which are controlled by respective circuits 7 and 9 corresponding thereto.

A track ball 1 serves as the manipulator for delivering the control signals for the step motors. The manipulator includes a housing 2 wherein a ball 3 is journalled for free rotation and which is coupled to two rotational transmitters. This control unit can, for example, be a type RB 300 unit of the firm Teldix GmbH of Heidelberg in the Federal Republic of Germany. This type of device provides two rectangular voltages displaced in phase by 90° for each coordinate and having a TTL level. The device delivers 300 pulses per rotation.

Figure 2:
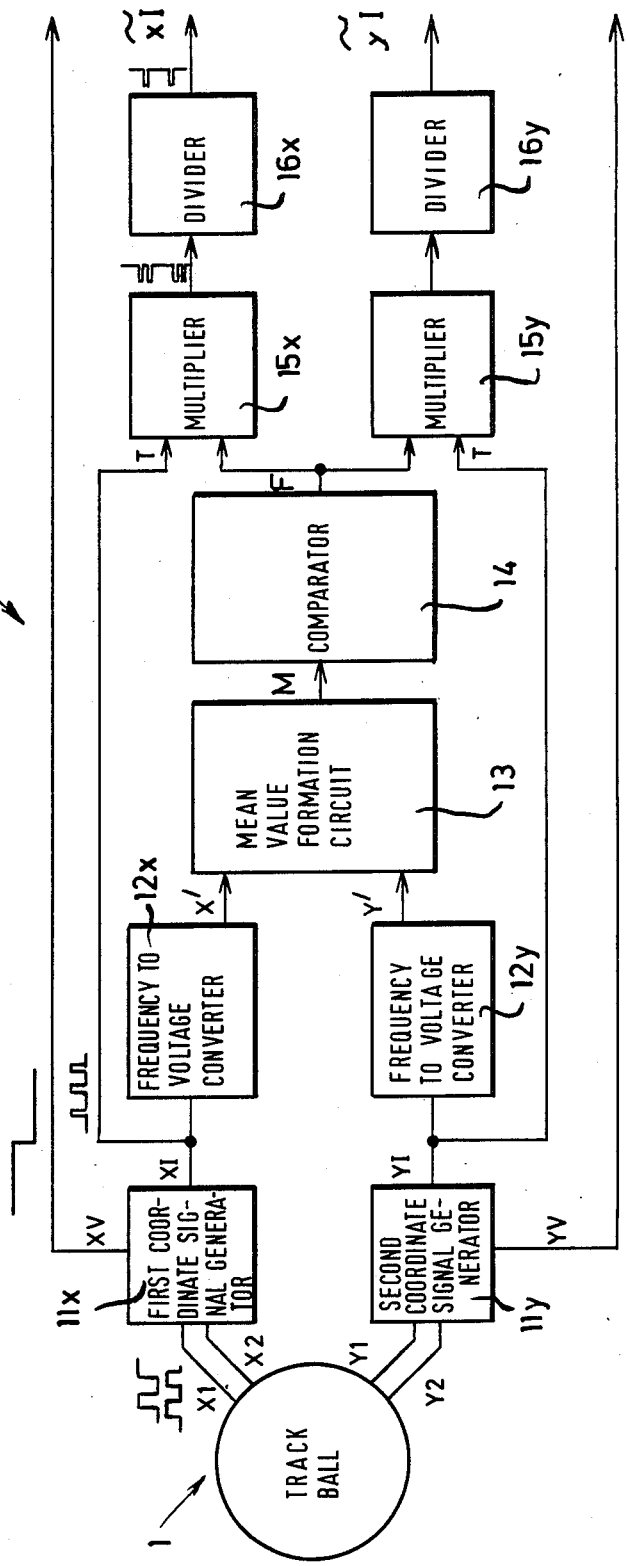
FIG. 2 is a block diagram of a first embodiment of the arrangement of the invention; and, FIG. 3 is a block diagram of a second embodiment of the arrangement of invention.

The arrangement 10 is connected between the track ball 1 and the drives 6 and 8. The output signals from the track ball 1 are multiplied in arrangement 10 by a factor dependent upon the speed of the actuation of the ball 3. The arrangement 10 is configured as shown in the schematic block diagram of FIG. 2.

The outputs of the track ball 1 are fed to two identical circuits 11x and 11y.

Circuit 11x forms for a first coordinate from the phase-displaced signal pair (X1, X2) a signal XV indicative of the sign of the roll movement and a pulse train XI indicative of the extent of the movement and having a frequency dependent upon the signal sequences X1 or X2. On the other hand, circuit 11y forms for a second coordinate from the phase-displaced signal pair (Y1, Y2) a signal YV indicative of the sign of the roll movement and a pulse train YI indicative of the extent of movement and having a frequency dependent upon the signal sequences Y1 or Y2.

The signals XV and YV are fed to control components 7 and 9, respectively, of motors 6 and 8, respectively, of the instrument shown in FIG. 1. In contrast, the signals XI and YI are directed to two likewise identical circuits 12x and 12y, respectively, wherein respective signals X' and Y' are formed which are proportional to the impulse frequencies XI and YI, respectively. The circuits 12x and 12y can be, for example, frequency-to-voltage convertors.

The two output signals X' and Y' of the circuits 12x and 12y, respectively, are directed together in a circuit 13 which forms the mean value M of the signals X' and Y'. A further circuit 14 is connected to the output of circuit 13 wherein the signal M is compared to the stored values of a data table. This circuit generates a signal F having a magnitude dependent upon signal M in a nonlinear manner determined instead from the data table. The circuits 13 and 14 can be realized, for example, by appropriately programmed microprocessors.

For the case where the circuits 12x and 12y are frequency-to-voltage convertors, it is recommended that an amplifier with an appropriate characteristic be utilized for the circuit 14.

Reference designations 15x and 15y identify two identical multiplier circuits wherein the number of impulses of the signal sequences XI and YI are multiplied by a factor proportional to the signal F. Dividers 16x and 16y are connected to the outputs of the multiplier circuits 15x and 15y, respectively, and are utilized to divide the frequencies of the respective signal sequences by a constant factor. The outputs of the dividers 16x and 16y therefore deliver impulses XI and YI having a number corresponding to the actuating displacement of the track ball 1 in the two coordinates multiplied by a factor dependent upon the mean value of the speed of the movements.

With the circuit shown, it is possible to displace the mechanical stage 5 of the microscope 4 of FIG. 1 rapidly over large distances by rotating the ball 3 of the track ball 1 very rapidly. After reaching the target position, the mechanical stage 5 can be adjusted with a correspondingly slow rotation of the ball 3.

If the divisor of each of the dividers 16x and 16y is variable and controlled in dependence upon the linear magnification of the microscope objective, the condition can be obtained that the reduction between the movement of the actuating manipulator and the effective displacement of the image realized by the observer is optimally adapted to the situation at hand independent of the adjusted enlargement.

Figure 3:
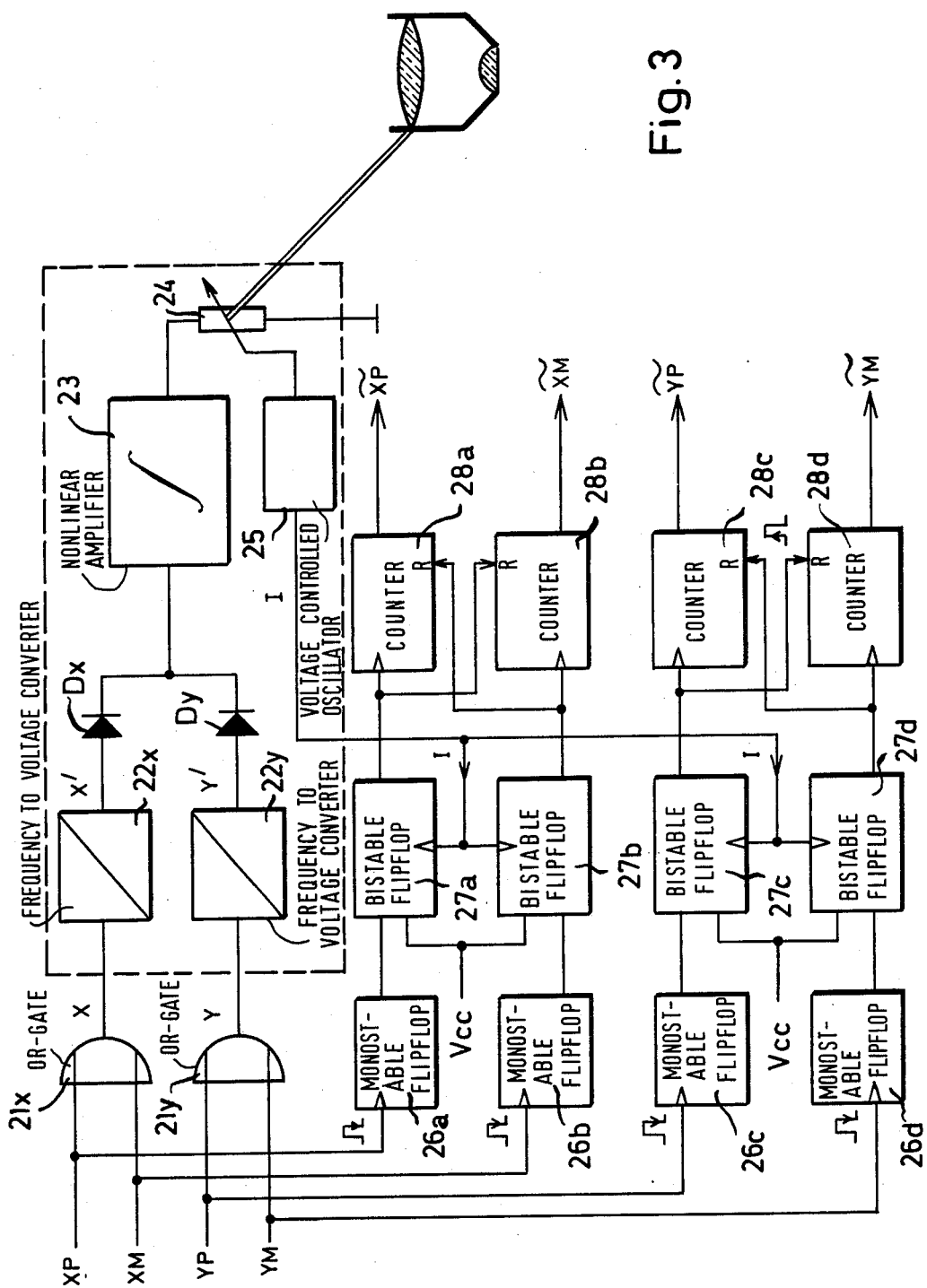

A further embodiment of the arrangement of the invention is shown in FIG. 3. In this embodiment, the track ball is adapted so that it delivers the following signals:

(1) a signal XP which comprises a rectangular wave only with a movement in the positive X direction and otherwise takes on the value zero;

(2) a signal XM which comprises a rectangular wave only for movement in the negative X direction and otherwise takes on a zero value;

(3) a signal YP which comprises a rectangular wave only for movement in the positive Y direction and otherwise takes on the value zero; and, (4) a signal YM which comprises a rectangular wave for movement in the negative Y direction and otherwise takes on a zero value.

Such a track ball is manufactured, for example, by Disc Instruments Inc. of Costa Mesa, Calif. and is known as type LT 200.

The signals XP and XM as well as signals YP and YM are delivered in pairs to two OR-components 21x and 21y, respectively. The outputs of the OR-components are connected to respective frequency-to-voltage convertors 22x and 22y. The respective outputs X' and Y' are connected together via respective diodes Dx and Dy. The analog signal generated in this manner is dependent upon the maximum of the frequencies of one of the inputs XP, XM, YP or YM. This analog signal passes through a nonlinear amplifier 23 having a progressive characteristic and is divided by a potentiometer 24 connected to the output of the amplifier 23. The tap of the potentiometer is coupled to the objective nose piece of the microscope. The divided analog signal is fed to a voltage-controlled oscillator 25 having a frequency dependent upon the linear magnification of the microscope objective and the speed of the actuation of the track ball 1.

The signals XP, XM, YP and YM are also fed to four monostable flipflops 26a, 26b, 26c and 26d, respectively, connected to bistable flipflops 27a, 27b, 27c and 27d, respectively. The output of the voltage-controlled oscillator 25 is connected with the clock input of each bistable flipflop 27. Accordingly, in the time that each one of the monoflops 26 is activated, the bistable flipflops 27 which are connected in cascade with the monoflops 26 are reset by each impulse of the oscillator 25. The time constants of the monoflops are so selected that they correspond to at least a period of the oscillator 25 at its lowest frequency.

The outputs of the flipflops 27 therefore deliver for each of the four coordinate directions a signal having a frequency corresponding to the outputs XP, XM or YP, YM of the track ball 1 multiplied by half the frequency of the oscillator 25.

The counters 28a to 28d are connected in cascade with the outputs of the flipflops 27 and are self resetting after each overrun. The frequency of the output signals of the flipflops 27 are reduced by these counters. The reset inputs R of the counters 28a, 28b and 28c, 28d are connected in pairs with the inputs of the counters 28b, 28a and 28d, 28c, corresponding to their complementary coordinates, respectively. In this way, each change in direction of the track ball in one of the coordinates X or Y causes the counters 28 to be reset to zero.

By an appropriate coordination of the periods of the monoflops 26, the lower frequency boundary of the oscillator 25 and the number of bits of the counters 28, the situation can be obtained that the output signals of the counters 28 are sufficiently finely graduated in dependence upon the speed of the actuation of the track ball.

The signals XP, XM, YP and YM in the outputs of the counters 28 serve again to control the step motors actuated by the track ball.

With this embodiment, the transmission ratio of the arrangement is dependent not only from the speed of the actuation of the track ball; instead, because of the coupling of the potentiometer 24 with the nose piece of the objective, it is also dependent from the linear magnification of the selected objective. This affords the advantage that the displacement of the image realized by the observer is independent of the particular objective utilized and the displacement can always be carried out with the same sensitivity.

The divider 24 can be dispensed with if the number of the bits of the counters 28 is variable. In this instance, the adjustment of the counter is controlled in dependence upon the linear magnification of the objective in order to obtain the desired above-mentioned effect. Such a digital solution offers advantages when compared with the analog solution described above.

It is understood that the foregoing description is that of the preferred embodiments of the invention and that various changes and modifications may be made thereto without departing from the spirit and scope of the invention as defined in the appended claims.

What is claimed is:

1. An arrangement for controlling the movement of a displaceable member of an apparatus, the arrangement comprising electro-mechanical manipulator means providing a first pair of signals in response to a mechanical displacement indicative of a first coordinate of a displacement through which the displaceable member is to be moved and a second pair of signals in response to said mechanical displacement and indicative of a second coordinate of the displacement through which the displaceable member is to be moved;
    sensing circuit means including:
    first circuit means for detecting said first pair of signals;
    second circuit means for detecting said second pair of signals;
    factor forming circuit means for combining the outputs of said first circuit means and said second circuit means and forming a factor dependent upon the speed of movement through said mechanical displacement;
    multiplier circuit means for multiplying said first pair of signals by said factor to form a first coordinate output signal for actuating said displaceable member in said first coordinate and for multiplying said second pair of signals by said factor fo form a second coordinate output signal for actuating said displaceable member in said second coordinate; and,
    frequency reducing means connected to the output of said multiplier means.

2. The arrangement of claim 1, said factor forming circuit means including signal amplifier means having a nonlinear characteristic connected in front of said multiplier circuit means.

3. The arrangement of claim 1, said frequency reducing means comprising divider means connected to the output of said multiplier circuit means.

4. The arrangement of claim 3, comprising counter means connected in cascade with said multiplier circuit means.

5. The arrangement of claim 1 wherein the displaceable member is a mechanical stage of a microscope, the arrangement comprising:
    motor drive means operatively connected to the mechanical stage for actuating the latter in response to said first coordinate output signal and said second coordinate output signal.

6. The arrangement of claim 1, said factor being dependent upon the microscope magnification.

7. The arrangement of claim 1, said frequency reducing means comprising divider means having a divisor adjustable in dependence upon the selected magnification of said microscope.

8. An arrangement for controlling the movement of a displaceable mechanical stage of a microscope, the arrangement comprising:
    motor drive means operatively connected to the mechanical stage for imparting movement thereto in two coordinates;
    electro-mechanical manipulator means providing a first pair of signals in response to said mechanical displacement and indicative of a first coordinate of a displacement through which the machanical stage is to be moved and a second pair of signals in response to said mechanical displacement and indicative of a second coordinate of the displacement through which the mechanical stage is to be moved;
    sensing circuit means including:
    first circuit means for detecting said first pair of signals;
    second circuit means for detecting said second pair of signals;
    speed signal forming circuit means for combining the outputs of said first circuit means and said second circuit means and forming a speed signal dependent upon the speed of movement through said mechanical displacement;
    said speed signal forming circuit means including an output amplifier having a nonlinear characteristic;
    a voltage divider connected across the output of said signal amplifier and having a tap operatively coupled to said microscope so as to permit adjustment of said divider in dependence upon the magnification of said microscope;
    a voltage-controlled oscillator electrically connected to said tap and having a frequency dependent upon the linear magnification of the microscope and the speed of the actuation of said manipulator means; and,
    multiplier means connected to said manipulator means and the output of said voltage controlled oscillator to form signals for actuating said motor drive means for movement in said coordinates; and,
    frequency reducing means connected to the output of said multiplier means.

9. The arrangement of claim 8, said frequency reducing means being counter means connected in cascade with said multiplier means, said counter means having a number of bits, said number of bits being adjustable in dependence upon the selected magnification of the microscope.

10. An arrangement for controlling the movement of a displaceable member of an apparatus, the arrangement comprising:
    electro-mechanical manipulator means for providing an electrical signal in response to a mechanical displacement indicative of a displacement through which the displaceable member is to be moved;
    first circuit means for sensing said signals and generating an electrical velocity factor having a nonlinear dependency upon the speed of said mechanical displacement;

multiplier circuit means for multiplying said electrical signal by said factor;

frequency reducing means connected to the output of said multiplier circuit means for dividing the output of said multiplier circuit means by a predetermined constant amount; and, actuator means for actuating said displaceable member in response to the output of said frequency reducing means.

11. The arrangement of claim 10, said first circuit means including means for generating a signal proportional to said electrical signal whereby said factor is increased in proportion to the speed of said mechanical displacement.

12. The arrangement of claim 11, wherein said manipulator means is manually manipulated, said first circuit means including nonlinear circuit means for forming said factor pursuant to a predetermined function thereby permitting said arrangement to be adapted to the motoric of the person operating said manipulator means.

13. The arrangement of claim 10, said manipulator means providing signals corresponding to respective individual coordinate speeds of said mechanical displacement, said second circuit means including multiplying means for multiplying all of said signals by a common factor.

14. The arrangement of claim 10, said actuating manipulator means being a track ball.

15. An arrangement for controlling the movement of a displaceable member of an apparatus, the arrangement comprising:

electro-mechanical manipulator means for providing electrical signals corresponding to respective individual coordinate speeds of a mechanical displacement indicative of a displacement through which the displaceable member is to be moved;

actuator means for actuating said displaceable member in response to said electrical signals;

first circuit means for sensing said signals and generating an electrical velocity factor dependent upon the speed of said mechanical displacement;

multiplier circuit means for multiplying all of said electrical signals by said factor; and, frequency reducing means connected to the output of said multiplier circuit means; and, said first circuit means including means for forming the mean value of said last-mentioned signals.

16. An arrangement for controlling the movement of a displaceable member of an apparatus, the arrangement comprising:

electro-mechanical manipulator means for providing electrical signals corresponding to respective individual coordinate speeds of a mechanical displacement indicative of a displacement through which the displaceable member is to be moved;

actuator means for actuating said displaceable member in response to said electrical signals;

first circuit means for sensing said signals and generating an electrical velocity factor dependent upon the speed of said mechanical displacement;

multiplier circuit means for multiplying all of said electrical signals by said factor; and, frequency reducing means connected to the output of said multiplier circuit means; and, said first circuit means including means for deriving said factor from the maximum of said speeds in said individual coordinates.

* * * * *

UNITED STATES PATENT AND TRADEMARK OFFICE
CERTIFICATE OF CORRECTION

PATENT NO. : 4,624,537

DATED : November 25, 1986

INVENTOR(S) : Adalbert Hanßen and Jürgen Schwarz

It is certified that error appears in the above-identified patent and that said Letters Patent is hereby corrected as shown below:

In the Abstract, line 3: delete the first "an".

In column 2, line 6: delete "one dimensional" and substitute -- one-dimensional -- therefor.

In column 2, line 14: delete "depending on" and substitute -- being assigned to -- therefor.

In column 2, line 40: after the word "of" add -- the --.

Signed and Sealed this

Twenty-eighth Day of April, 1987

Attest:

DONALD J. QUIGG

Attesting Officer     Commissioner of Patents and Trademarks